United States Patent
Goel et al.

(10) Patent No.: US 6,359,708 B1
(45) Date of Patent: Mar. 19, 2002

(54) OPTICAL TRANSMISSION LINE AUTOMATIC POWER REDUCTION SYSTEM

(75) Inventors: Vibha Prakash Goel, Tinton Falls; Bradley A. McKay, Fair Haven, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/932,679

(22) Filed: Sep. 18, 1997

(51) Int. Cl.[7] .............................................. H04B 10/08
(52) U.S. Cl. ....................... 359/110; 359/161; 359/177
(58) Field of Search .................................. 359/110, 161, 359/177

(56) References Cited

U.S. PATENT DOCUMENTS

| | | | |
|---|---|---|---|
| 4,994,675 A | | 2/1991 | Levin et al. ................. 250/551 |
| 5,099,349 A | * | 3/1992 | Yoshida et al. ............. 359/161 |
| 5,225,922 A | * | 7/1993 | Chraplyvy et al. ......... 359/124 |
| 5,428,471 A | * | 6/1995 | McDermott ................. 359/177 |
| 5,615,033 A | * | 3/1997 | Yoshida et al. ............. 359/110 |
| 5,771,114 A | * | 6/1998 | Andersson et al. ......... 359/171 |
| 5,914,794 A | * | 6/1999 | Fee et al. ................... 359/110 |
| 5,923,453 A | * | 7/1999 | Yoneyama ................. 359/177 |
| 6,075,629 A | * | 6/2000 | Al-Salameh et al. ....... 359/110 |
| 6,115,157 A | * | 9/2000 | Barnard et al. ............. 359/124 |
| 6,178,025 B1 | * | 1/2001 | Hardcastle et al. ......... 359/177 |
| 6,194,707 B1 | * | 2/2001 | Yang ..................... 250/227.15 |

FOREIGN PATENT DOCUMENTS

| EP | 0382 243 A | 8/1990 |
|---|---|---|
| EP | 0 437 162 A | 7/1991 |
| WO | WO 97 24823 A | 7/1997 |

* cited by examiner

Primary Examiner—Leslie Pascal
Assistant Examiner—Hanh Phan
(74) Attorney, Agent, or Firm—Steve Mendelsohn

(57) ABSTRACT

A facility is provided which detects the loss of a high power signal in an optical transmission path and invokes a procedure which causes a transmitter connected to the fiber to reduce the power level at which it is transmitting optical signals over the fiber to a safe level.

21 Claims, 4 Drawing Sheets

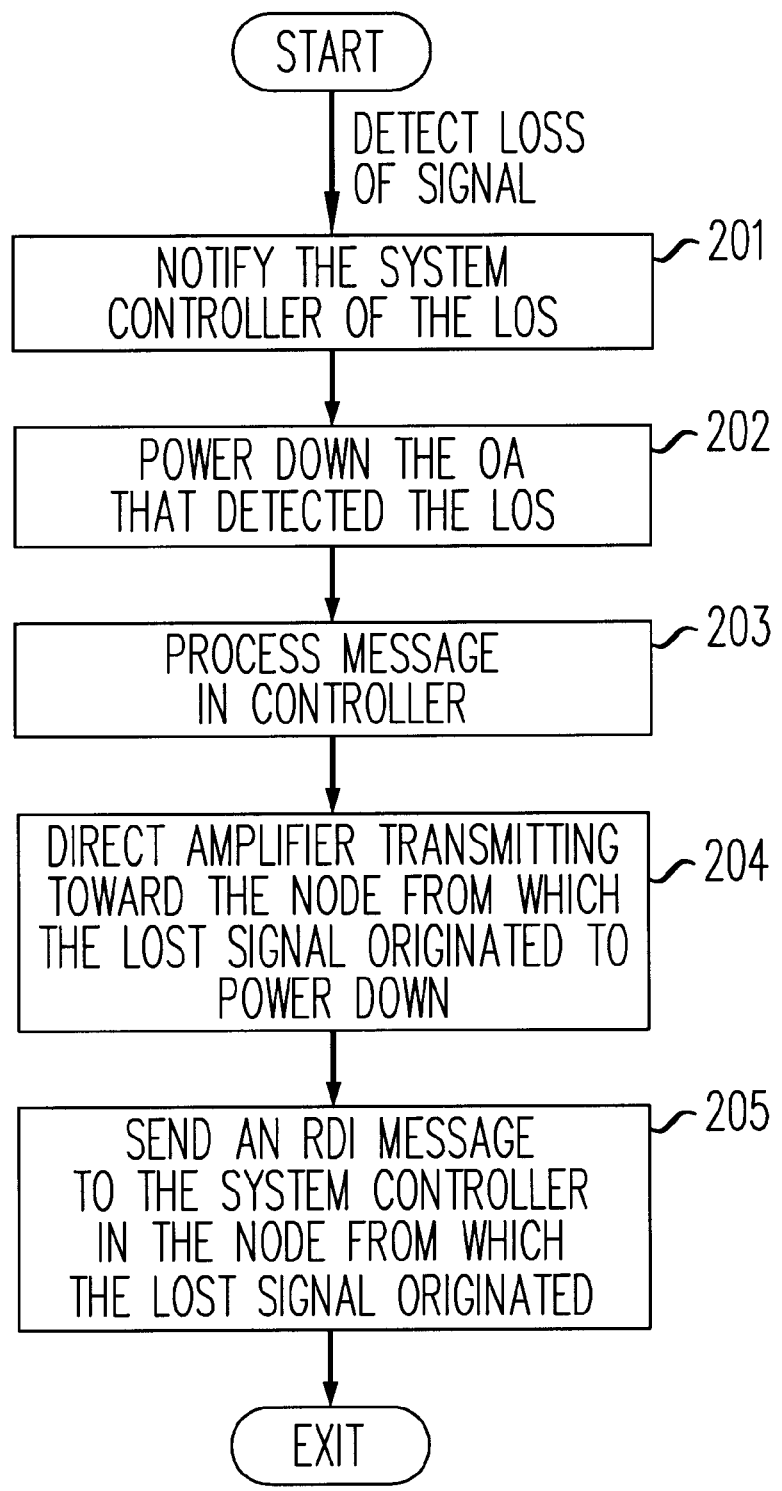

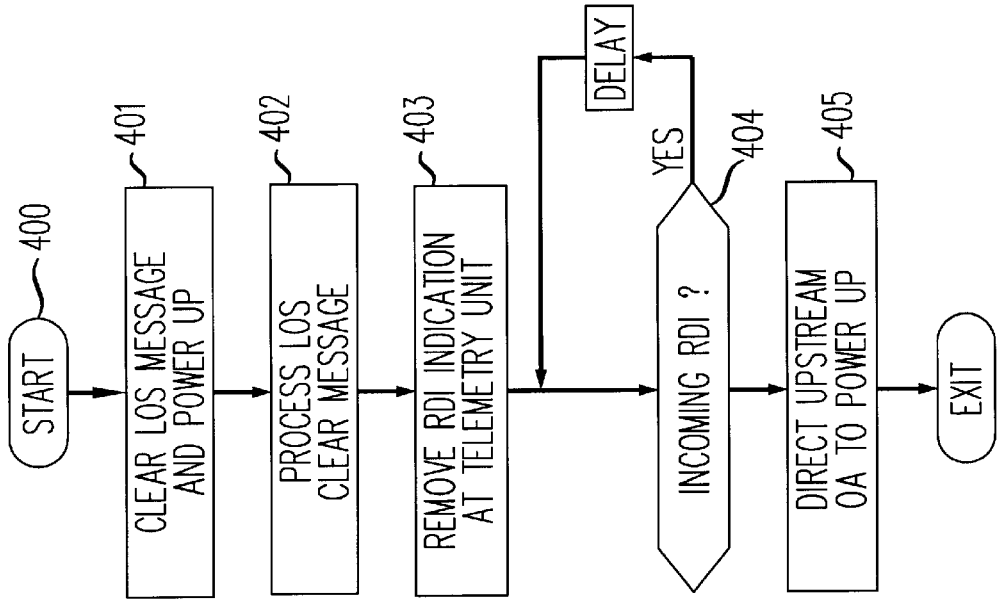
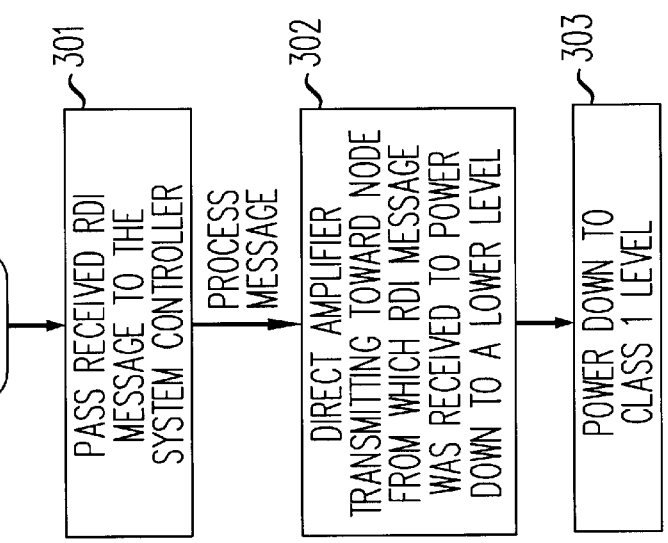

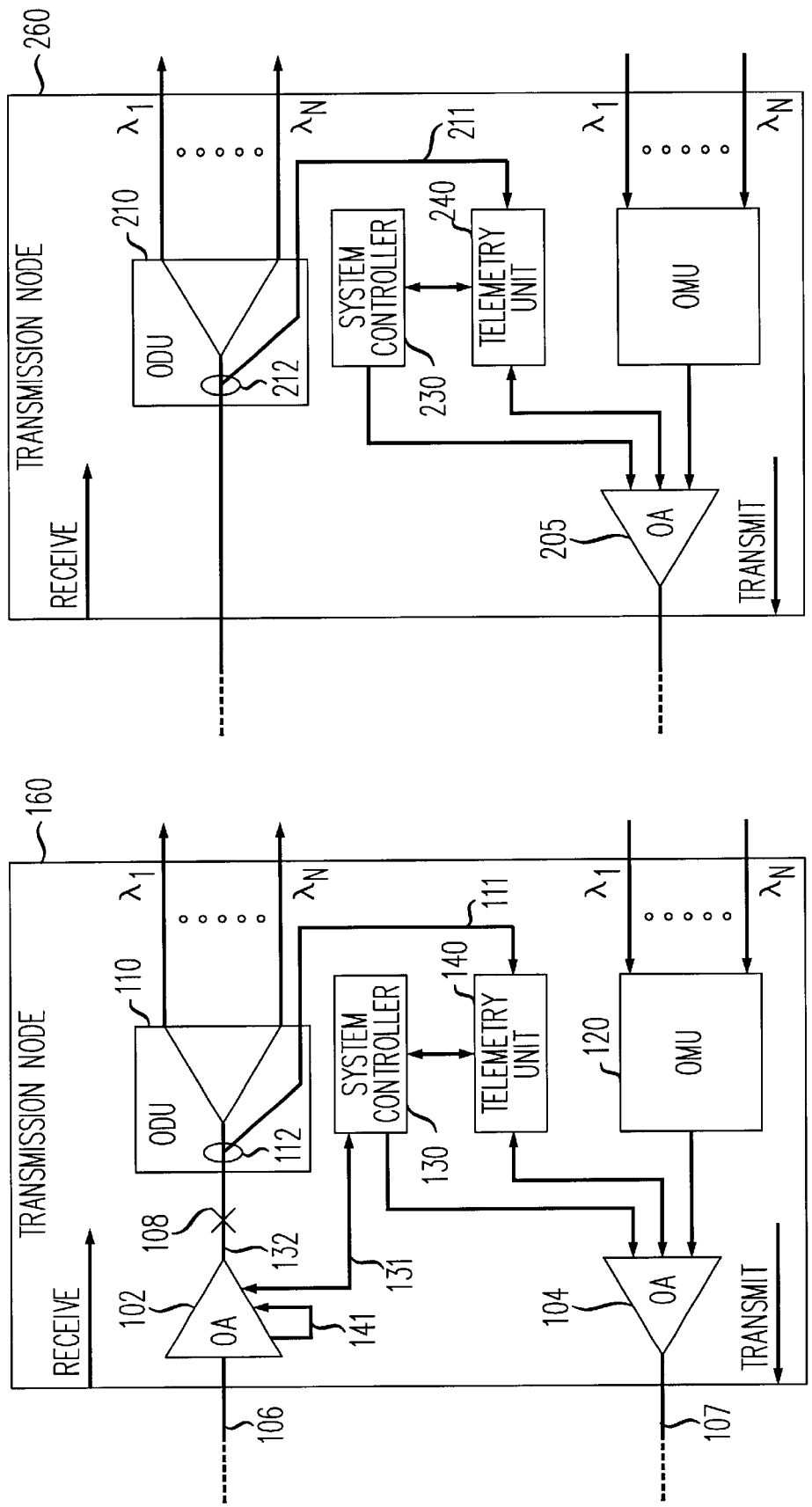

OPTICAL TRANSMISSION LINE AUTOMATIC POWER REDUCTION SYSTEM

FIELD OF THE INVENTION

The invention relates to optical transmission systems and more particularly to the power level of optical signals transmitted over an optical line/fiber.

BACKGROUND OF THE INVENTION

In low powered optical transmission systems, optical signals are transmitted over an optical line/fiber at a so-called class 1 power level (which is typically less than 10 dBm for an optical wavelength of 1550 nm). If the line were accidentally cut, it is likely that the optical signal would still be transmitted, and thus emitted from the transmission side of the cut fiber. A receiver at the opposite end of the other side of the cut fiber would detect loss of the transmitted signal and issue an alarm, which would cause a craftsperson to be dispatched to the location at which the fiber is cut to repair the cut in a conventional manner. It is unlikely that, due to the low power of the transmitted light signal, the craftsperson would be harmed if he/she happened to look at the concentrated light signal being emitted from the transmission end of the cut fiber while making the repair. If, however, the system were a high power system, one which transmits optical signals at a class 3B power level (which is typically greater than 17 dBm for an optical wavelength of 1550 nm), then it is likely that the craftsperson would be harmed as a result of looking at the concentrated/focused light. (Note that such harm could include damage to the craftsperson's retina.) Moreover, system apparatus may be harmed from a power surge as the system cable is restored to service.

To avoid such harm, there is need for a high power optical transmission system that automatically reduces the power of a light signal that is being transmitted over a fiber that appears to be cut at some upstream point. In fact, this need is mandated by the well-known international standard IEC 825 for optical transmission systems as set forth by International Electro-technical Commission (IEC), see, for example, the IEC publication International Standard IEC825, Safety of Laser Products part 1: Equipment Classification, Requirements and User's Guide, 1993, which is hereby incorporated by reference.

SUMMARY OF THE INVENTION

We deal with the foregoing problem by automatically reducing to safe level the high power level at which an optical amplifier is transmitting an optical signal over a fiber/path that may be cut.

More specifically, we arrange a controller associated with an optical node that detects the loss of signal (LOS) on a fiber so that it sends to an upstream controller a message requesting that the optical amplifier transmitter connected to the fiber associated with the LOS reduce its power amplification at which it is transmitting optical signals over that fiber, an upstream element receiving the message then causes the optical amplifier to reduce the power level at which it is transmitting optical signals from a first power level to a second power level.

These and other aspects of our invention are set forth in the following detailed description and accompanying claims and drawings.

BRIEF DESCRIPTION OF THE DRAWING

In the drawing:

FIGS. 2, 3 and 4 are flow charts of system procedures which implement the principles of the invention in the system of FIG. 1;

FIG. 5 illustrates a case in which the principles of the invention are brought into play to deal with the detection of a loss-of-signal at a point between a receiving optical amplifier and optical demultiplexing unit; and FIG. 6 illustrates a case in which the principles of the invention are brought into play to deal with the detection of a loss-of-signal in a single span optical transmission path having an optical amplifier only at the transmitting end of a circuit.

DETAILED DESCRIPTION

Figure 1:
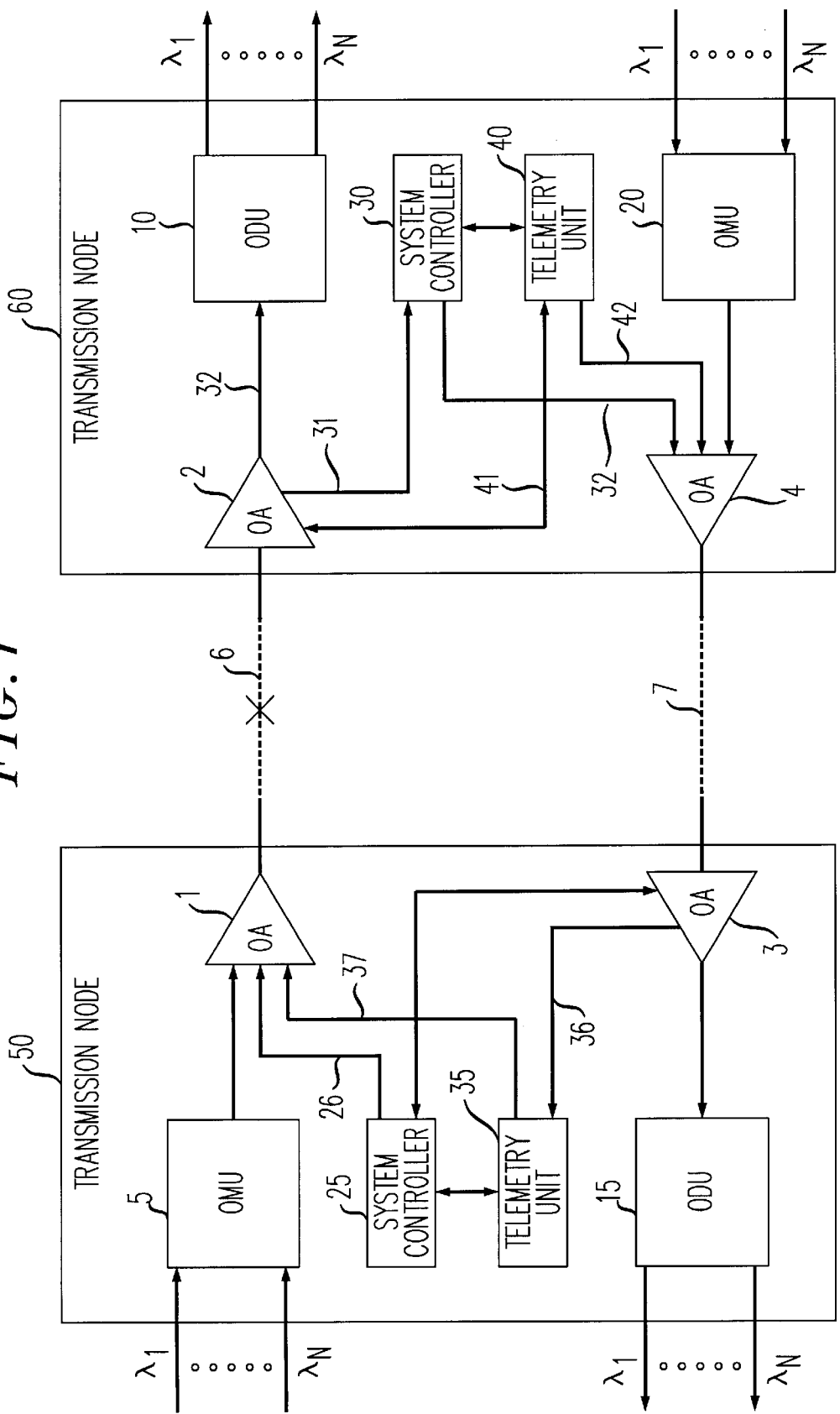
FIG. 1 is a broad block diagram of an optical transmission system in which the principles of the invention may be practiced.

FIG. 1 shows an illustrative optical transmission system which meets the requirements for a class 3B optical transmission system as specified by the aforementioned IEC standards. That is, it is assumed that the system of FIG. 1 transmits optical signals at a power level of, for example, +19 dBm. Specifically, conventional Modulation Unit (OMU) 5, which may be, for example, a conventional wavelength division multiplexer (WDM), receives information bearing optical signals each having a unique wavelengths $\lambda_i$ from respective sources and multiplexes the received signals to an output extending via an optical transmission facility, an optical fiber, to a conventional optical amplifier (OA) 1. OA 1 amplifies and outputs to transmission facility 6, i.e., an the optical fiber, optical signals that it receives from OMU 5, in which the outputted signal has a power level of approximately 19 dBm. Conventional optical amplifier (OA) 2 connected to the opposite end of facility 6 receives the outputted optical signal and similarly amplifies the signal. The amplified result is then presented to conventional optical demultiplexer unit (ODU) 10, which demultiplexes the signal in a conventional manner to recover and output the original information bearing optical signals $\lambda_i$.

The information bearing optical signals traversing the opposite path via OMU 20, OA 4, transmission facility/path 7, OA 3 and ODU 15 are similarly amplified and processed.

Each of the transmission nodes 50 and 60, which perform such amplification and processing, also includes a system controller and telemetry unit, as shown in the FIG. Note that a discussion of the system controller and telemetry unit in node 50 equally pertains to the corresponding apparatus in node 60 and vice versa. More specifically, OA 1 combines the multiplexed signal that it receives from OMU 5 with an optical supervisory signal having a unique wavelength that OA 1 receives from telemetry unit 35. That is, OA 1 combines a supervisory (maintenance) message that telemetry unit 35 receives from controller 25 with the other signals that it receives from OMU 5 for transmission over path 6. In the other direction, OA 3 separates the optical supervisory signal (carrying the maintenance information originated by controller 30) from the signal that is received over transmission facility 7 and supplies the separated optical signal to telemetry unit 35. Telemetry unit 35 supplies the maintenance message to controller 25, as is done conventionally. System controller 30, telemetry unit 40 and OA 2 and 4 operate similarly.

With the foregoing in mind, consider the situation in which transmission facility 6 is accidentally cut (for example at the point marked with an x) preventing the signal that OA 1 transmits over that facility from reaching OA 2. When OA 2 detects in a conventional manner that it is no longer receiving a signal over transmission facility/fiber 6 (as shown in the system flow chart of FIG. 2), OA 2, in accord with an aspect of the invention, generates and supplies a message indicative of that fact to system controller 30 via path 31 (see block 201 of system flow chart of FIG. 2). In addition, OA 2, in accord with another aspect of the invention, reduces the power level of the signal that it outputs to path 32 (block 202, FIG. 2).

System controller 30 (block 203) upon receipt of the LOS message from OA 2 directs OA 4 to reduce the power level at which it is transmitting signals over path 7 to a class 1 level (block 204), in accordance with another aspect of the invention. Controller 30 causes OA 4 to reduce its power level since there is a chance that path 7 is in the same cable as path 6 and that cable may have been totally cut.

Disadvantageously, OA 1 may be unaware of the cut and may continue to transmit its optical signal at a high level of power, e.g., the class 3B level. As mentioned above, that signal is concentrated/focused at the transmission end of cut facility 6, which could harm a craftsperson who accidentally looks at the signal directly without proper eye protection.

We address that problem, in accordance with an aspect of the invention, by arranging controller 25 so that it notifies OA 1 to "power down" to a safe level, e.g., a class 1 level. In particular, in response to receipt of the loss-of-signal (LOS) message from OA 2 (block 203), system controller 30 (block 204) sends via telemetry unit 40 and OA 4 a so-called Remote Defect Indicator (RDI) message to the upstream node 50 (block 205). Telemetry unit 40, in turn, reformats the message for insertion via path 42 into the supervisory channel that is added to the modulated signals that OA 4 receives from OMU 20. Upon receipt of that message, OA 4 in conventional manner adds it to the signal stream that it receives from OMU 20. OA 4 then outputs the result to transmission facility 7.

Upon receipt of the signal stream, OA 3 separates the optical supervisory signal (carrying the maintenance information originated by controller 30) from the signal that is received over transmission facility 7 and supplies the separated optical signal to telemetry unit 35. Telemetry unit 35, in a conventional manner passes the RDI message to controller 25, as shown at block 301, FIG. 3. Controller 25, in turn, processes the RDImessage to determine which OA is transmitting over the cut facility, e.g., facility 6. As a result of such processing, controller 25 identifies OA 1 and then directs (block 302) OA 1 via path 26 to power down, for example, power down to the class 1 level, all in accordance with an aspect of the invention. OA 1 responds to such direction (block 303) and reduces the power level of the signal that it outputs to facility 6 accordingly so that a craftsperson who is sent to the site of the cut is not harmed by the concentrated/focused light while repairing cut facility 6.

When the cut facility 6 has been repaired, and OA 2 starts receiving the signals that OA 1 is transmitting at the class 1 level, then OA 2 clears the Loss of Signal (LOS) state that it previously experienced and sends a message indicative of such clearing to system controller 30 via path 31 (as shown at block 401 of the system flowchart shown in FIG. 4). OA 2 also "powers up" to the previous power level. Controller 30 processes (block 402) the LOS clear message that it receives from OA 2 by clearing (block 403) the outgoing RDI at telemetry unit 40, and then checking for the presence of an incoming RDI (block 404). (Note, if facility/path 6 had been cut, then it is likely that facility 7 was also cut, as mentioned above. Because of that possibility, then, with the clearing of the LOS, OA 2 may start receiving an RDI from the upstream end to indicate an LOS at OA 3.) If such checking is affirmed, then controller 30 exits and waits for the clearing of the incoming RDI. Otherwise, or upon receipt of the cleared RDI message, controller 30 (block 405) directs OA 4 to power up.

Note, if facility 7 had also been cut, then node 50 similarly initiates the procedures characterized by FIGS. 2 through 4.

It is possible that a cable cut could occur at a location other than along paths 6 or 7. For example, the transmission path could be disrupted at a point between the output of an optical amplifier and an ODU. In that instance, an optical amplifier would be to unable to detect the LOS and report the loss to initiate a reduction in the power level of the signal that is being transmitted and emitted at the cut end of the fiber. We handle that problem, in accordance with an aspect of the invention, by arranging the ODU so it reports the loss of the signal (LOS) to, for example, the telemetry unit, as shown in FIG. 5.

We do this by "looping back" the maintenance/supervisory channel at OA 102 as represented by loop-back path 141 so that the channel is reinserted into the signal path and thus supplied to the associated ODU 110. At ODU 110 we use a conventional splitter 112 to separate the supervisory from the other channels (bandwidths) and pass the maintenance/supervisory channel to the telemetry unit 140 via path 111. In this way, if a disruption occurs at 108, then telemetry unit 140 will no longer receive the supervisory channel and will report that fact to system controller 130. OA 102 will also report via path 131 that it is receiving the supervisory channel. Based on that information, system controller 130 concludes that the flow of the signal was disrupted at some point along path 132, rather than path 106, and, therefore, directs OA 102 and OA 104 to reduce their output power level to a class 1 level. Moreover, if OA 102 reports an LOS, then system controller 130 concludes that the signal flow has been disrupted at some point along path 106 and proceeds in the manner discussed above.

System controller 130 clears the power reduction state when it no longer is receiving an RDI, and telemetry unit 140 resumes reporting that it is receiving the supervisory signal, as discussed above.

The foregoing is also applicable to other transmission arrangements, such as a so-called two amplifier arrangement having an optical amplifier only at the transmitting end of a circuit, and not at the receiving end of the circuit/path, as illustrated in FIG. 6. For such an arrangement, the supervisory channel is separated at the ODU 210 via conventional splitter 212 and passed to telemetry unit 240 via path 211 as shown in FIG. 6. Controller 230 initiates a power reduction state when telemetry unit 240 reports a loss of the supervisory signal. Controller 230 thereafter clears the power reduction state if it is not receiving an RDI and telemetry unit 240 reports that it is once again receiving the supervisory channel.

The foregoing is merely illustrative of the principles of the invention. Those skilled in the art will be able to devise numerous arrangements, which, although not explicitly shown or described herein, nevertheless embody those principles that are within the spirit and scope of the invention. For example, the system controller mentioned above may be arranged so that it initiates a power reduction or restoration only if a "loss of signal" and "restoration of the signal"

persists continuously for predetermined period of time so that it does not respond to a momentary signal "drop out". Moreover, the overall process of detecting a LOS and reducing power is completed within 3 seconds. Also, the restoration process is completed within several seconds after a cut fiber has been repaired.

We claim:

1. Apparatus comprising an optical transmission system formed by at least first and second optical transmission paths, in which opposite ends of each of the paths are respectively connected to an optical transmitter and an optical receiver such that an optical receiver connected to a respective one of the first and second optical transmission paths is co-located with the optical transmitter connected to the other one of the first and second optical transmission paths, a first controller, operative whenever the optical receiver connected to said first optical transmission path detects a loss of signal from that path, for forming a message identifying the loss of said signal and inserting the message in a predetermined channel of an optical signal also containing information originating from a respective source that is being sent over the second optical transmission path, apparatus for receiving the message with said information, said apparatus including a second controller, responsive to receipt of the message, for causing the optical transmitter connected to the first optical transmission path to reduce the power level at which it is transmitting optical signals from a first power level to a second power level, and a demultiplexing element connected to the output of the optical receiver connected to the first optical transmission path, said demultiplexing element including an optical tap circuit for separating an optical supervisory signal from the optical signals received by that optical receiver and supplying the supervisory signal to an associated telemetry unit, said telemetry unit being operative for detecting a loss of the supervisory signal and notifying the first controller of such a loss, said first controller being further operative for sending via the second optical transmission path a message requesting that the optical transmitter connected to the first optical transmission path reduce its power amplification at which it is transmitting optical signals over said first optical transmission path, and the second controller, responsive to receipt of the message, for causing that optical transmitter to reduce its power level from the first power level to the second power level.

2. The apparatus of claim 1 wherein said first controller is further operative, following the sending of said message, for causing the optical transmitter connected to the second optical transmission path to reduce its power level at which it is transmitting information bearing optical signals over the second optical transmission path from the first power level to the second power level.

3. The apparatus of claim 1 wherein the first power level is greater than a class 1 power level and the second power level is less than the class 1 power level.

4. The apparatus of claim 1 wherein said optical receiver is further operative for detecting the return of the optical signal on the first optical transmission path and wherein said first controller, responsive to the optical receiver detecting the return of the optical signal, is operative for forming a message requesting that the optical transmitter connected to the first optical transmission path increase its power amplification at which it is transmitting optical signals over the associated one of the optical transmission paths, and inserting the message in the predetermined channel of an information bearing optical signal that is being sent over the second optical transmission path, and wherein said second controller, responsive to receipt of the message, for then causing that optical transmitter to increase the power level at which it is transmitting optical signals from the second power level to the first power level.

5. The apparatus of claim 4 wherein the first controller, responsive to receiving, following the detection of the return of the optical signal, a remote defect indicator indicating that the second optical transmission path may be faulty, does not increase the power level of the optical transmitter connected to the first optical transmission path from the second power level to the first power level.

6. The apparatus of claim 5 wherein the first controller, responsive to the remote defect indicator being cleared, causes the optical transmitter connected to the second optical transmission path to increase its power level from the second power level to the first power level.

7. The apparatus of claim 1 wherein the telemetry unit is further operative for detecting the return of the supervisory signal from the demultiplexing unit and for notifying the first controller of such return, the first controller, responsive to such notification of the return of the supervisory signal, being operative for sending via the second optical transmission path the message requesting that the optical transmitter connected to the first optical transmission path increase its power amplification at which it is transmitting optical signals over said one of the optical transmission paths, and wherein the second controller, responsive to receipt of the message, being operative for causing that optical transmitter to increase the power level at which it is transmitting optical signals from the second power level to the first power level.

8. Apparatus comprising a bi-directional optical transmission system formed by at least two optical transmission paths, in which each of the paths includes at least an optical transmitter and a demultiplexing element for receiving optical signals via a respective one of the optical transmission paths, each demultiplexing element including an optical tap for separating a supervisory signal from the optical signals received over the respective one of the optical transmission paths, a detector unit for detecting the absence of the separated supervisory signal, a first controller, operative whenever the detector unit detects a loss of the supervisory signal, for sending via the other one of the optical transmission paths a message requesting that the optical transmitter connected to said respective one of the optical transmission paths reduce its power amplification at which it is transmitting optical signals including the supervisory signal over said one of the optical transmission paths, and a second controller, disposed at the receiving end of the other one of the optical transmission paths and responsive to receipt of the message, for causing the optical transmitter to reduce the power level at which it is transmitting optical signals from a first power level to a second power level.

9. The apparatus of claim 8 wherein the first power level is greater than a class 1 power level and the second power level is less than the class 1 power level.

10. The apparatus of claim 8 wherein said detector unit is further operative for detecting the return of the supervisory signal from the associated demultiplexing element, and wherein said first controller, responsive to the detector unit detecting the return of the supervisory signal, for sending via the other one of the optical transmission paths a message requesting that the optical transmitter connected to said one of the optical transmission paths increase its power amplification at which it is transmitting optical signals over said one of the optical transmission paths, and wherein said second controller, responsive to receipt of the message, being operative for causing the optical transmitter to increase the power level at which it is transmitting optical signals from the second power level to the first power level.

11. Apparatus comprising
a bi-directional optical transmission system formed by at least two optical transmission paths, in which each of the paths includes at least an optical transmitter and an optical receiver, the optical receiver being operative for detecting a loss of signal from the associated one of the optical transmission paths;
a first controller, operative whenever the optical receiver detects a loss of signal from the associated one of the optical transmission paths, for forming a message requesting that the optical transmitter connected to said one of the optical transmission paths reduce the level of power at which it is transmitting optical signals over said one of the optical transmission paths, and transmitting the message in an optical signal containing main data over the other one of the optical transmission paths,
a second controller, disposed at the receiving end of the other one of the optical transmission paths and responsive to receipt of the message, for causing the optical transmitter connected to said one of the optical transmission paths to reduce the power level at which it is transmitting optical signals from a first power level to a second power level, wherein said first controller is further operative for causing the optical transmitter connected to the other one of the optical transmission paths to also reduce the power level at which it is transmitting optical signals over the other one of the optical transmission paths from the first power level to the second power level, and
a demultiplexing element connected to the output of the optical receiver connected to the first optical transmission path, said demultiplexing element including an optical tap circuit for separating an optical supervisory signal from the optical signals received by that optical receiver and supplying the supervisory signal to an associated telemetry unit, said telemetry unit being operative for detecting a loss of the supervisory signal and notifying the first controller of such a loss, said first controller being further operative for sending via the second optical transmission path a message requesting that the optical transmitter connected to the first optical transmission path reduce its power amplification at which it is transmitting optical signals over said first optical transmission path, and the second controller, responsive to receipt of the message, for causing that optical transmitter to reduce its power level from the first power level to the second power level.

12. The apparatus of claim 1, wherein, when the optical receiver detects a loss of signal in the first optical transmission path, the optical receiver reduces the power level at which it is transmitting optical signals to the demultiplexing element.

13. A node for an optical transmission system, comprising:
(a) a transmitter, configurable via a first optical transmission path to transmit optical signals to an other node of the optical transmission system;

(b) a receiver, configurable via a second optical transmission path to receive optical signals from the other node;
(c) a controller;
(d) a demultiplexer capable of separating a supervisory signal from the optical signals received by the receiver; and
(e) a telemetry unit configured to receive the supervisory signal from the demultiplexer, wherein:
the receiver is capable of detecting a loss of signal (LOS) in the second optical transmission path and notifying the controller of the LOS;
when the receiver notifies the controller of the LOS in the second optical transmission path, the controller inserts an LOS message identifying the LOS into the optical signals transmitted via the first optical transmission path to the other node to instruct the other node to reduce the power level at which it is transmitting optical signals in the second optical transmission path;
when the controller receives an LOS message from the other node identifying an LOS in the first optical transmission path, the controller causes the transmitter to reduce the power level at which it is transmitting optical signals in the first optical transmission path;
the telemetry unit is capable of detecting a loss of the supervisory signal (LOSS) and notifying the controller of the LOSS;
when the telemetry unit notifies the controller of the LOSS in the second optical transmission path, the controller inserts an LOSS message identifying the LOSS into the optical signals transmitted via the first optical transmission path to the other node to instruct the other node to reduce the power level at which it is transmitting optical signals in the second optical transmission path; and
when the controller receives an LOSS message from the other node identifying an LOSS in the first optical transmission path, the controller causes the transmitter to reduce the power level at which it is transmitting optical signals in the first optical transmission path.

14. The node of claim 13, wherein, when the receiver detects the LOS in the second optical transmission path, the controller causes the transmitter to reduce the power level at which it is transmitting optical signals in the first optical transmission path.

15. The node of claim 13, wherein:
the receiver is capable of detecting a return of signal (ROS) in the second optical transmission path and notifying the controller of the ROS;
when the receiver notifies the controller of the ROS in the second optical transmission path, the controller inserts an ROS message identifying the ROS into the optical signals transmitted via the first optical transmission path to the other node to instruct the other node to increase the power level at which it is transmitting optical signals in the second optical transmission path; and
when the controller receives an ROS message from the other node identifying an ROS in the first optical transmission path, the controller causes the transmitter to increase the power level at which it is transmitting optical signals in the first optical transmission path.

16. The node of claim 13, wherein:
the telemetry unit is capable of detecting a return of the supervisory signal (ROSS) and notifying the controller of the ROSS;

when the telemetry unit notifies the controller of the ROSS in the second optical transmission path, the controller inserts an ROSS message identifying the ROSS into the optical signals transmitted via the first optical transmission path to the other node to instruct the other node to increase the power level at which it is transmitting optical signals in the second optical transmission path; and when the controller receives an ROSS message from the other node identifying an ROSS in the first optical transmission path, the controller causes the transmitter to increase the power level at which it is transmitting optical signals in the first optical transmission path.

17. The node of claim 13, wherein, when the receiver detects the LOS in the second optical transmission path, the receiver reduces the power level at which it is transmitting optical signals to the demultiplexer.

18. A node for an optical transmission system, comprising:

(a) a transmitter, configurable via a first optical transmission path to transmit optical signals to an other node of the optical transmission system;

(b) a demultiplexer, configurable to separate a supervisory signal from optical signals received from the other node via a second optical transmission path;

(c) a controller; and (d) a telemetry unit, configured to receive the supervisory signal from the demultiplexer, detect a loss of the supervisory signal (LOSS), and notify the controller of the LOSS, wherein:

when the telemetry unit notifies the controller of the LOSS in the second optical transmission path, the controller inserts an LOSS message identifying the LOSS into the optical signals transmitted via the first optical transmission path to the other node to instruct the other node to reduce the power level at which it is transmitting optical signals in the second optical transmission path; and when the controller receives an LOSS message from the other node identifying an LOSS in the first optical transmission path, the controller causes the transmitter to reduce the power level at which it is transmitting optical signals in the first optical transmission path.

19. The node of claim 18, wherein:

the telemetry unit is capable of detecting a return of the supervisory signal (ROSS) and notifying the controller of the ROSS;

when the telemetry unit notifies the controller of the ROSS in the second optical transmission path, the controller inserts an ROSS message identifying the ROSS into the optical signals transmitted via the first optical transmission path to the other node to instruct the other node to increase the power level at which it is transmitting optical signals in the second optical transmission path; and when the controller receives an ROSS message from the other node identifying an ROSS in the first optical transmission path, the controller causes the transmitter to increase the power level at which it is transmitting optical signals in the first optical transmission path.

20. The node of claim 18, further comprising a receiver, wherein the demultiplexer is indirectly configurable to the second optical transmission path via the receiver.

21. The node of claim 18, wherein the demultiplexer is directly configurable to the second optical transmission path.

* * * * *